Feb. 13, 1962 G. M. SOMMER ET AL 3,021,146
SEALS
Filed Jan. 10, 1958 2 Sheets-Sheet 1

INVENTORS:
GORDON M. SOMMER
VINCENT J. MANKOWSKY
BY
ATT'YS

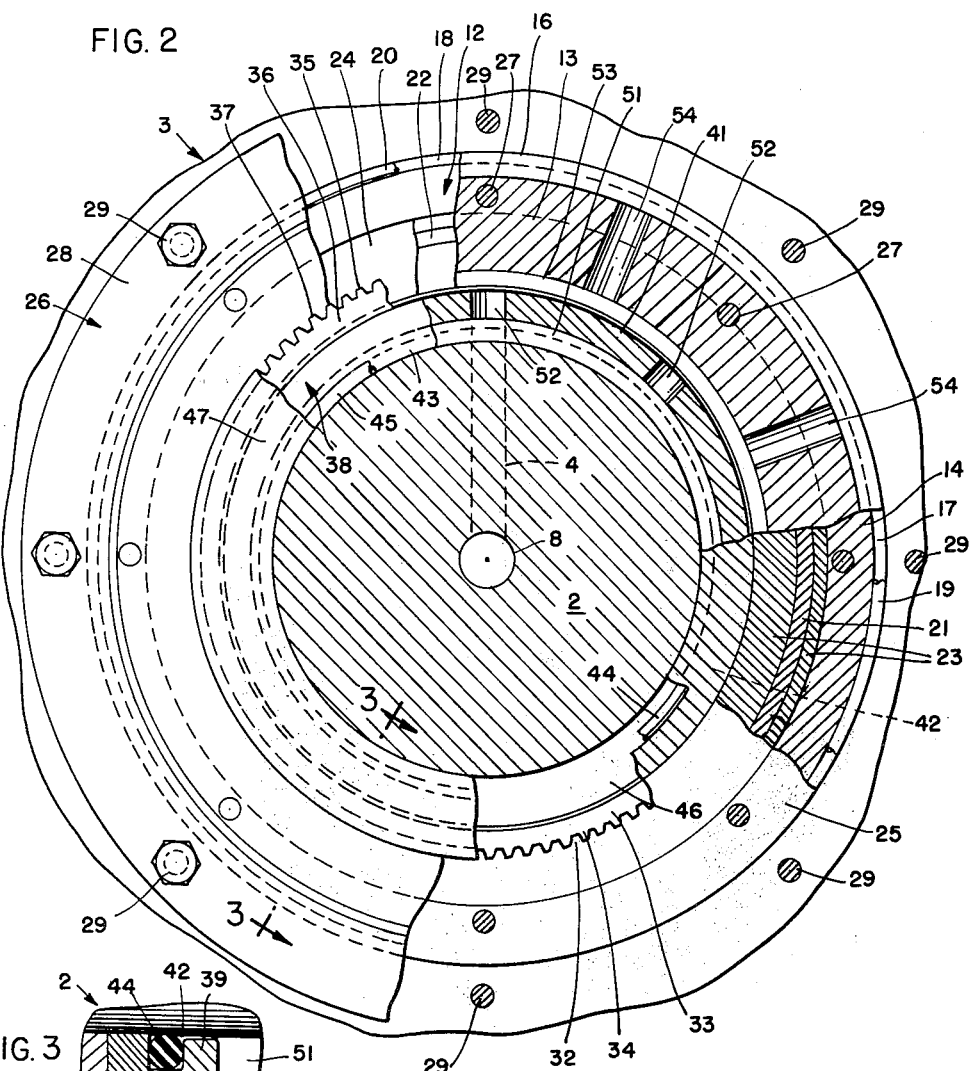
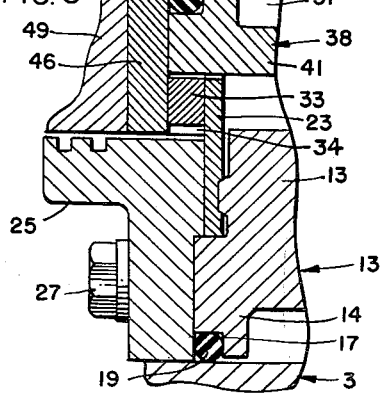

3,021,146
SEALS
Gordon M. Sommer, Hinsdale, and Vincent J. Mankowsky, Chicago, Ill., assignors to U. S. Industries, Inc., New York, N.Y., a corporation of Delaware
Filed Jan. 10, 1958, Ser. No. 708,327
2 Claims. (Cl. 277—3)

This invention relates to seals and, more particularly, to seals of the type adapted to afford an air seal between a shaft and parts disposed radially outwardly thereof in rotatable relation thereto.

In many instances it is desired to feed air longitudinally through a shaft and then radially outwardly therethrough into parts mounted on the shaft, the shaft and the parts being rotatable relative to each other. Air seals for connecting a shaft to such parts have heretofore been known in the art, but have had several inherent disadvantages such as, for example, being large and cumbersome in size; being complicated in construction and operation; being difficult and expensive to manufacture; being subject to rapid wear between the parts thereof; being inefficient in operation, or the like. It is an important object of this invention to overcome such disadvantages.

Another object of the present invention is to afford a novel air seal of the aforementioned type which is relatively simple in construction and operation.

Another object is to provide a novel air seal of the aforementioned type which is efficient in operation and affords an effective seal against the escape of air from between such a shaft and associated parts.

Yet another object of the present invention is to afford a novel air seal having a long life, and wherein the parts thereof are not subjected to excessive wear in normal operation.

An ancillary object is to afford a novel air seal, the parts of which are so constituted and arranged that the mating surfaces of the sealing members are not subjected to load when the seal is not charged with pressurized air.

A further object is to provide a novel air seal which is effective to feed air, over a relatively large pressure range, from such a shaft to such parts disposed on the shaft without appreciable leakage of air from between the shaft and the parts.

Another object of the present invention is to afford a novel air seal of the aforementioned type which is relatively simple to assemble and disassemble.

Another object is to afford a novel air seal wherein the parts thereof are constituted and arranged in a novel and expeditious manner.

Yet another object of the present invention is to afford a novel air seal of the aforementioned type which may be readily mounted in operative position on such shafts.

A further object of the invention is to provide a novel air seal of the aforementioned type which is so constructed that an increase in the internal pressure therein increases the sealing characteristics thereof in a novel and expeditious manner.

Another object of the present invention is to enable a novel air seal of the aforementioned type to be so constructed that the complete air seal, and the parts thereof, may be readily and economically produced commercially.

Other and further objects of the present invention will be apparent from the following description and claims and are illustrated in the accompanying drawings which, by way of illustration, show the preferred embodiment of the present invention and the principles thereof, and what we now consider to be the best mode in which we have contemplated applying these principles.

Other embodiments of the invention embodying the same or equivalent principles may be used and structural changes may be made as desired by those skilled in the art without departing from the present invention and the purview of the appended claims.

In the drawings:

FIG. 2 is a sectional view taken substantially along the line 2—2 in FIG. 1, with the parts thereof progressively broken away from left to right in a clockwise direction, to show underlying parts; and FIG. 3 is a fragmentary detail sectional view taken substantially along the line 3—3 in FIG. 2.

Figure 1:
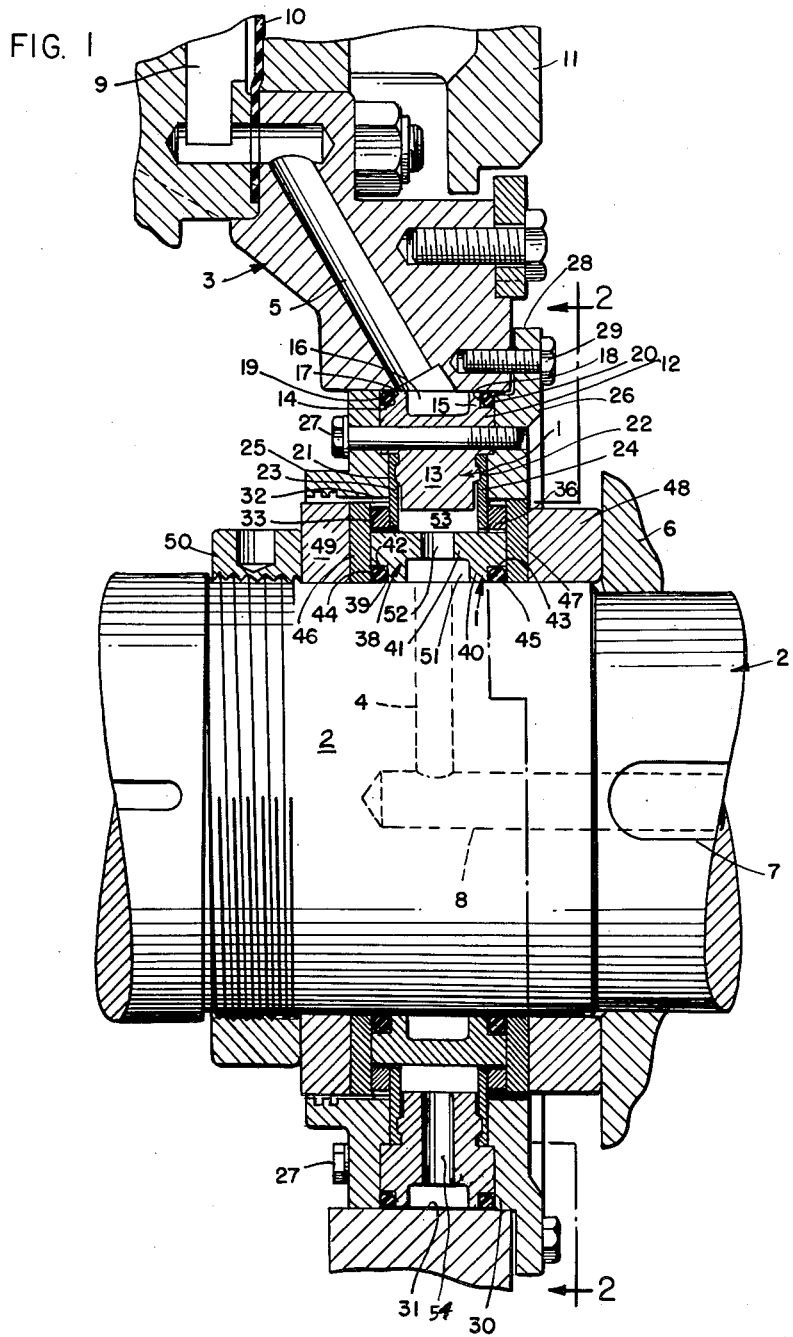
FIG. 1 is a longitudinal sectional view of an air seal embodying the principles of the present invention, showing the air seal mounted in operative position on a shaft.

An air seal 1, embodying the principles of the present invention, is shown in the drawings to illustrate the preferred embodiment of the present invention.

In the drawings, the air seal 1 is shown mounted on a shaft 2 within a sleeve 3 in operative position to feed compressed air from a radially extending passageway 4 in the shaft 2 to a passageway 5 in the sleeve 3. The shaft 2 and the sleeve 3 may be part of any suitable mechanism such as, for example, the mechanism shown in the copending application for United States Letters Patent of Gordon M. Sommer, Charles L. Mitchell and Vincent J. Mankowsky, filed January 10, 1958, Serial No. 708,-286, wherein the sleeve or hub 6 forms part of a clutch for drivingly connecting a sleeve, such as the sleeve 3, and associated parts to a drive shaft, such as the drive shaft 2. The sleeve 6 is keyed to the shaft 2 by suitable means such as a key 7, FIG. 1, and is held against movement to the right, as viewed in FIG. 1, longitudinally of the shaft 2 by any suitable means, not shown. In the operation of the mechanism, of which the sleeve 6 forms a part, and which is merely shown by way of illustration herein, air is fed through a longitudinally extending passageway 8 in the shaft 2 to the passageway 4, and thence through the air seal 1 and the passageway 5 into a chamber 9 where it is effective to bulge a diaphragm 10 to the right as viewed in FIG. 1, to thereby move a piston 11 to the right on sleeve 3, as viewed in FIG. 1. The shaft 2 and the sleeve 3 are rotatable relative to each other when the aforementioned clutch is not engaged, air is not being fed under pressure through the air seal 1, and the piston 11 is disposed to the left, as viewed in FIG. 1. The sleeve 3 is drivingly connected to the shaft 2 for rotating the latter therewith when air is fed under pressure through the air seal 1, and the piston 11 is disposed to the right, as viewed in FIG. 1. It is felt that it is not necessary to discuss in detail the construction and operation of the driving mechanism with which the air seal 1 is associated, the details of construction thereof not forming a part of the present invention except insofar as they form a part of our novel combination.

The air seal 1 shown in the drawings embodies an annular-shaped spacer 12 which is substantially Y-shaped in cross section, FIG. 1, having an elongated stem or body portion 13 and two radially outwardly projecting, substantially annular-shaped ears 14 and 15, defining the opposite sides of a centrally disposed annular recess 16 in the outer periphery of the spacer 12. The outer corners of the ears 14 and 15 are cut away to afford recesses 17 and 18, respectively, in which O-rings 19 and 20 of a suitable material such as, for example, suitable polymerized chloroprene rubber, such as that commonly known as Neoprene, may be mounted.

The body portion 13 of the annular-shaped spacer 12 has two annular-shaped ribs 21 and 22 projecting outwardly from the opposite lateral sides thereof and extending around the spacer 12 in inwardly spaced relation to the ears 14 and 15. Two annular-shaped diaphragms 23 and 24 are disposed on opposite sides of the body portion 13 of the spacer 12 in juxtaposition to the ribs 21 and 22, respectively, the diaphragms 23 and 24 terminating at their outer peripheral edge portions in abutting engagement with the inner peripheral edges of the ears 14 and 15, and the inner peripheral edges of the diaphragms 23 and 24 projecting inwardly past the inner edge of the spacer 12, FIG. 1. The diaphragms 23 and 24 are flexible and resilient and, preferably, are relatively soft and pliable. They may be made of any suitable material such as, for example, nylon fabric impregnated and coated with a suitable synthetic rubber, such as, a suitable copolymer of butadiene and chloroprene such as that commonly known as "Buta-N."

Two retaining rings or clamping rings 25 and 26 are disposed on opposite sides of the spacer 12, in juxtaposition to the diaphragms 23 and 24, respectively, and are clampingly held in engagement with the spacer 12 by bolts 27 extending through the ring 25 and the spacer 12 and threadedly engaged in the ring 26. The clamping rings 25 and 26 are of such size and shape that when they are so held by the bolts 27, they are held in clamping relation to the spacer 12 from the outer peripheral edge thereof to a point below the ribs 21 and 22, and are effective to retainingly clamp the outer edge portions of the diaphragms 23 and 24 against the sides of the spacer 12, with the ribs 21 and 22 being pressed into the diaphragms 23 and 24 to securely hold the latter against withdrawal from such clamped position. Also, it will be seen that when the rings 25 and 26 are so disposed on the spacer 12, they define the laterally outward boundaries of the recesses or channels 17 and 18 in which the O-rings 19 and 20 are disposed.

The clamping ring 26 has a flange 28 projecting radially outwardly from the rear outer peripheral edge portion thereof, and the clamping ring 26 is secured to the sleeve 3 by a plurality of bolts 29 which extend through the flange 28 and are threadedly engaged in the sleeve 3 in position to hold the flange 28 in juxtaposition to one lateral face of the sleeve 3, with the clamping ring 25, the spacer 12, and the front edge portion 30, of the clamping ring 26 disposed in the sleeve 3. The clamping ring 25, the spacer 12, and the front edge portion 30 of the clamping ring 26, are of such diameter that they fit snugly, but with a free running fit, in the sleeve 3. The O-rings 19 and 20 are of such size that they project radially outwardly from the recesses 17 and 18 into sealing engagement with the inner face 31 of the sleeve 3.

The clamping ring 25 has a plurality of axially extending splines 32 formed in the rear inner edge portion thereof, and a seal ring 33 having axially extending splines 34 on the outer peripheral edge portion thereof, is mounted in the rear edge portion of the clamping ring 25, with the splines 34 operatively engaged with the splines 32. The seal ring 33 may be made of any suitable material such as, for example, fabric impregnated with a suitable thermosetting resin such as a suitable phenol-formaldehyde resin, and is mounted forwardly of the diaphragm 23 in position to be operatively engaged by the latter when air is fed into the air seal 1, as will be discussed in greater detail presently.

Similarly, the inner forward edge portion of the clamping ring 26 has a plurality of axially extending splines 35 on the front inner edge portion thereof, and a seal ring 36 having a plurality of axially extending splines 37 on the outer periphery thereof, is mounted in the clamping ring 26 rearwardly of the diaphragm 24 with the splines 35 engaged with the splines 37.

The clamping rings 25 and 26 and the spacer 12 may be made of any suitable material such as, for example, steel, and it will be seen that the clamping rings 25 and 26, the spacer 12, the diaphragms 23 and 24, and the seal rings 33 and 36, are all connected to the sleeve 3 for rotation therewith.

Inwardly of the spacer 12 and the seal rings 33 and 36, another annular-shaped spacer 38 is mounted on the shaft 2. The spacer 38 is substantially channel-shaped in cross section, embodying two radially inwardly projecting annular flanges 39 and 40 interconnected by a web portion 41. The laterally outer, radially inner corners of the spacer 38 are cut away to form recesses 42 and 43, and O-rings 44 and 45 are mounted in the recesses 42 and 43 in position to sealingly engage the outer peripheral surface of the shaft 2. The O-rings 44 and 45 may be made of any suitable material such as, for example, that previously discussed with respect to the O-rings 19 and 20.

Two identical substantially flat annular-shaped wear rings 46 and 47 are disposed on the shaft 2 on opposite sides of the spacer 38, the wear ring 46 being disposed forwardly of the seal ring 33 and the wear ring 47 being disposed rearwardly of the seal ring 36. A spacer ring 48 is mounted on the shaft 2 between the wear ring 47 and the sleeve or hub member 6 of the aforementioned clutch. Another spacer ring 49 is mounted on the shaft 2 forwardly of the wear ring 46, and a locknut 50 is threaded onto the shaft 2 forwardly of the spacer 49 in position to clamp the spacers 48 and 49, the wear rings 46 and 47, and the spacer 38, between the locknut 50 and the hub member 6 to thereby hold the spacers 48 and 49, the wear rings 46 and 47, and the spacer 38 against rotation relative to the shaft 2. The locknut 50, the spacer rings 48 and 49, the wear rings 46 and 47, and the spacer 38 may be made of any suitable material such as, for example, steel, and the wear rings 46 and 47 are preferably case hardened steel. The wear rings 46 and 47 are of such size that they fit snugly, but with a free running fit in the clamping rings 25 and 26, with the wear ring 46 disposed forwardly of the splines 32, and the wear ring 47 disposed rearwardly of the splines 35.

The seal rings 33 and 36, are of such size, and the diaphragms 23 and 24 are disposed in such position, that when the sleeve 3 is rotating relative to the shaft 2 with no air pressure pressing outwardly on the diaphragms 23 and 24, the seal rings 33 and 36 are disposed between the wear ring 46 and the diaphragm 23, and the wear ring 47 and the diaphragm 24, respectively, with a loose fit so that the seal rings 33 and 36 are not pressed against the wear rings 46 and 47 and, therefore, during such operation the wear rings 46 and 47 and the seal rings 33 and 36 are not subjected to any appreciable wear.

As may be seen in FIG. 2, the web 41 of the spacer 38 is disposed in spaced relation to the shaft 2 in such position as to afford an annular-shaped recess 51 extending around the inner surface of the spacer 38 between the flanges 39 and 40. The spacer 38 is so disposed on the shaft 2 that the recess 51 is in communication with the outer end of the opening 4 in the shaft 2. A plurality of equally spaced openings 52 extend outwardly through the web portion 41 of the spacer 38, around the spacer 38 and open outwardly into the space or chamber 53 in the air seal 1 afforded between the inner end of the outer spacer ring 12 and the outer end of the inner spacer ring 38. A plurality of openings 54, equally spaced around the spacer ring 12 extend radially outwardly therethrough to afford communicating passageways between the chamber 53 and the chamber 16 disposed between the sleeve 3 and the spacer 12.

Hence, it will be seen that when air is fed under pressure from the opening 8 through the opening 4, it passes through the chamber 51, the openings 52, the chamber 53, the openings 54, the chamber 16, and into the passageway 5, from whence it may flow into the chamber 9 to thereby move the piston 11 to the right as viewed in FIG. 1. It will be seen that the O-rings 44 and 45 are effective to prevent outward flow of air from the chamber 51 axially between the shaft 2 and the spacer 38, and the O-rings 19 and 20 are effective to prevent outward flow of air from the chamber 16 axially outwardly between the spacer 12 and the sleeve 3. The spacers 48, the wear rings 46 and 47, and the spacer 38, are clamped together sufficiently tightly to prevent radial outward flow of air therebetween. Similarly, the clamping rings 25 and 26 and the spacer 12 are clamped together by the bolts 27 sufficiently tightly to prevent radial outward flow of air therebetween.

As for air escaping axially outwardly from the chamber 53, our novel air seal 1 is constructed in such a manner as to effectively prevent such undesirable escape of air therefrom. This is true even though the clamping rings 25 and 26, the spacer ring 12, the diaphragms 23 and 24, and the seal rings 33 and 36, are rotatable as a unit with the sleeve 3, and therefore, are rotatable relative to the spacers 48 and 49, the wear rings 46 and 47, and the spacer ring 38, when the sleeve 3 and the shaft 2 are rotated relative to each other, as will now be discussed in greater detail.

When the sleeve 3 and the shaft 2 are rotating relative to each other without air being fed under pressure through the passageways 8 and 4, the seal rings 33 and 36 are free to move away from the wear rings 46 and 47 a limited distance so that, during such operation, there is no appreciable wear therebetween. When, during such relative rotation of the sleeve 3 and the shaft 2, air is fed under pressure through the passageways 8 and 4, the air seal 1, and into the passageway 5, the pressure thus afforded in the chamber 53 presses outwardly on the inner peripheral edge portions of the diaphragms 23 and 24 to thereby press these portions and the seal rings 33 and 36 outwardly toward the wear rings 46 and 47, respectively. This outward movement of the seal rings 33 and 36 is effective to firmly engage seal rings 33 and 36 with the wear rings 46 and 47 to thereby afford an effective seal against escape of air between the seal rings 33 and 36 and the wear rings 46 and 47, respectively. At the same time, the outward pressure of the air in the chamber 53 on the diaphragms 23 and 24 is effective to firmly press the diaphragms 23 and 24 against the axial inner faces of the seal rings 33 and 36 to thereby effect a seal between the seal rings 33 and 36 and the clamping rings 25 and 26, respectively, which is highly effective to prevent the outward flow of air therebetween. With the air seal 1 constructed in this novel manner, as pressure is increased therein the sealing effect is also increased between the diaphragms 23 and 24, the seal rings 33 and 36, and the wear rings 46 and 47 so that the air seal 1 is effective both at relatively low pressure operation and relatively high pressure operation.

When the air seal 1 is used for connecting a shaft such as the shaft 2 to a sleeve 3, which forms a part of a mechanism such as that disclosed in the aforementioned copending application, Serial No. 708,286, when air is not being fed under pressure through the seal 1, the sleeve 3 and the shaft 2 rotate relative to each other. When air is then fed through the air seal 1 through passageways such as the pasageways 8 and 4, the air pressure in the chamber 53 does build up sufficiently to press the seal rings 33 and 36 against the wear rings 46 and 47, respectively, while these members are still rotating relative to each other. However, this is only for a very short interval of time, the clutch of which the sleeve 6 forms a part being effective to quickly couple the sleeve 3 to the shaft 2 for rotation therewith, so that relative rotation between the seal rings 33 and 36 and the wear rings 46 and 47, respectively, is quickly stopped, and the internal pressure in the air seal 1 holds the seal rings in tight sealing engagement with the wear rings. The air pressure used to actuate mechanisms such as that shown in the aforementioned copending application is often in the nature of eighty-five pounds per square inch, and it has been found that our novel air seal is highly effective at such pressures.

From the foregoing it will be seen that the present invention affords a novel air seal wherein the undesirable escape of air therefrom is effectively prevented.

Also, it affords a novel air seal which is relatively small and compact, and which may be quickly and easily assembled and disassembled.

In addition, the present invention affords a novel air seal which is practical and efficient in the feeding of air radially between a shaft and another part rotatably mounted on the shaft, radially outwardly thereof.

Furthermore, it will be seen that the present invention affords a novel air seal which is relatively simple in construction and may be readily and economically produced commercially.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:

1. A seal of the type adapted to feed working fluid radially outwardly from a shaft to a radially outwardly disposed part mounted on said shaft in rotatable relation to said shaft, said seal comprising an outer sleeve and having two oppositely disposed outer end portions having inwardly projecting axially extending splines on the inner end portions of said outer end portions, an inner sleeve mounted in said outer sleeve and rotatable as a unit relative to said outer sleeve, said inner sleeve including two ring members mounted in said outer end portions axially outwardly of said splines, said outer sleeve having two other ring members having outwardly projecting axially extending splines, said other ring members being mounted in respective ones of said inner end portions of said outer end portions with said splines on said respective other ring members and said inner end portions operatively engaged with each other, said outer sleeve also including two annular-shaped diaphragms disposed inwardly of said other ring members in position to sealingly engage said other ring members, and means in said sleeves for feeding working fluid outwardly therethrough between said diaphragms, in position to press said diaphragms outwardly away from each other and against respective ones of said other ring members and thereby press said other ring members outwardly against respective ones of said first mentioned ring members, said diaphragms being freely movable inwardly away from said other rings and said other rings being freely movable inwardly away from said first mentioned ring member when said diaphragms are not so pressed outwardly by said working fluid.

2. An air seal as defined in claim 1, and in which said means for feeding air comprises annular chambers in the inner and outer peripheries of said intermediate portions of said inner and outer sleeves, respectively, an annular-shaped chamber between said intermediate portions and opening onto said diaphragms, and passageways extending between said last mentioned annular chamber and said first mentioned annular chambers.

References Cited in the file of this patent

UNITED STATES PATENTS

| | | |
|---|---|---|
| 1,851,723 | Neidow | Mar. 29, 1932 |
| 2,226,001 | La Bour | Dec. 24, 1940 |
| 2,362,363 | Doede | Nov. 7, 1944 |
| 2,662,480 | Cliborn | Dec. 15, 1953 |
| 2,772,897 | Shaw et al. | Dec. 4, 1956 |
| 2,882,075 | Biering et al. | Apr. 14, 1959 |

FOREIGN PATENTS

| | | |
|---|---|---|
| 730,762 | Germany | Jan. 18, 1943 |